United States Patent
Sommer, Jr. et al.

(10) Patent No.: US 7,286,634 B2
(45) Date of Patent: *Oct. 23, 2007

(54) METHOD AND APPARATUS FOR IMPROVING BAGGAGE SCREENING EXAMINATION

(75) Inventors: Edward J. Sommer, Jr., Nashville, TN (US); Richard E. Hill, Nashville, TN (US); Charles E. Roos, Nashville, TN (US)

(73) Assignee: Select Technologies, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/938,238

(22) Filed: Sep. 10, 2004

(65) Prior Publication Data

US 2005/0111618 A1 May 26, 2005

Related U.S. Application Data

(63) Continuation-in-part of application No. 10/328,328, filed on Dec. 23, 2002, now Pat. No. 7,012,256.

(60) Provisional application No. 60/501,741, filed on Sep. 10, 2003, provisional application No. 60/501,767, filed on Sep. 10, 2003.

(51) Int. Cl.
*G01N 23/04* (2006.01)

(52) U.S. Cl. ........................ 378/57; 250/359.1

(58) Field of Classification Search .................. 378/57, 378/58; 250/358.1, 359.1, 360.1
See application file for complete search history.

(56) References Cited

U.S. PATENT DOCUMENTS

| | | | | |
|---|---|---|---|---|
| 5,600,303 A | * | 2/1997 | Husseiny et al. | 378/57 |
| 5,818,897 A | * | 10/1998 | Gordon | 378/19 |
| 5,838,758 A | * | 11/1998 | Krug et al. | 378/53 |
| 6,707,879 B2 | * | 3/2004 | McClelland et al. | 378/57 |
| 6,839,403 B1 | * | 1/2005 | Kotowski et al. | 378/57 |
| 2006/0274916 A1 | * | 12/2006 | Chan et al. | 382/100 |

* cited by examiner

*Primary Examiner*—Jurie Yun
(74) *Attorney, Agent, or Firm*—Wyatt, Tarrant & Combs, LLP

(57) ABSTRACT

A method and apparatus are disclosed for screening articles such as baggage, utilizing a computerized touch sensitive screen or other computerized pointing device for operator identification and electronic marking of objects within the article to be further examined. Baggage is electromagnetically scanned while traveling on a conveyer and an electronic image is taken of each article and stored in a computer. The present system utilizes a plurality of visual display devices, each with an examiner, which are likely located remotely of the screening operation. Each examination continues independently of the scanning such that there is no interruption in the flow of articles should an examiner detect an object of interest and worthy of further examination, either by screen or by physical examination.

71 Claims, 6 Drawing Sheets

METHOD AND APPARATUS FOR IMPROVING BAGGAGE SCREENING EXAMINATION

CROSS REFERENCE TO RELATED APPLICATIONS

This application claims priority of Provisional Application Ser. No. 60/501,741 filed Sep. 10, 2003, Provisional Application Ser. No. 60/501,767 filed Sep. 10, 2003, and is a continuation-in-part of utility application Ser. No. 10/328,328 filed Dec. 23, 2002, now U.S. Pat. No. 7,012,256, PCT/US04/24607 filed Jul. 30, 2004, all of which are fully incorporated herein by reference.

STATEMENT REGARDING FEDERALLY SPONSORED RESEARCH OR DEVELOPMENT

Development of this technology has been assisted with funding from NSF SBIR Award DMI-0232800.

BACKGROUND OF THE INVENTION

The aviation security industry has a clear and pressing need for improvements in security effectiveness while reducing costs of operations. There has been a vastly increased emphasis on improving national security since the terrorist attacks of Sep. 11, 2001. Current bag/item screening methods at entry points to secure areas in airports and other security sensitive installations are essentially manual systems that take a little advantage of today's computerized technologies. Typically, situated at the entry to an airport concourse, for instance, is a security checkpoint station having x-ray scanners for inspection of carry-on bags/items. An inspector (screener) who examines the x-ray images of bags/items passing through a scanner is stationed at each scanner. If a screener sees a potential threat object in an x-ray image, he/she typically suspends image scanning and inspection and verbally alerts search personnel stationed in the vicinity of the x-ray machine conveyor to remove the bag/item in question to search for the object. Often the search person is called over to the x-ray image monitor to look at the object on the screen to help in the search of the bag/item. In the meantime, flow of traffic through the security checkpoint halts while this communication is going on. Lines at these x-ray machines are often long and can be quite slow, especially with today's increased threats of terrorism. Current processing rates through a typical security checkpoint are relatively slow and labor costs are high. The Transportation Security Administration's (TSA) FY2004 projected airport screener labor costs are $1.36 billion accounting for over 75% of the TSA budget for airport passenger screening. TSA has publicly expressed a desire to reduce the labor costs associated with passenger and baggage screening.

The rate of flow of people and their carried baggage/items through security checkpoints such as in airport concourses or other entrances to secure premises is limited in present day systems which have a single image screening inspection station associated with each x-ray scanner and which require that manual visual inspection by a screener (security person) at that inspection station of an x-ray image resulting from a scan be completed before the next image scan can be taken by the x-ray scanner. An x-ray image produced from the scanning may show an individual bag, an individual item, or a group of bags and/or items depending upon how they are presented to the scanner (ie. singly or in groups). In this document reference to a bag/item, bags/items, bags, baggage, items, articles, or similar reference is meant to include any of single articles as well as grouped articles presented to the scanner. The x-ray scanner generates an electronic image of a bag/item being scanned as the bag/item passes through the x-ray scanning region. The image is displayed on the scanner's screener inspection station monitor screen. Visual inspection of the image must be completed before another bag/item is scanned since a subsequent scan causes the displayed image to be replaced with a new x-ray image generated by the new scan. In today's scanners the scanning conveyor is controlled by the screener at the single screener inspection station and is stopped by the screener after each x-ray scan of a bag/item to allow the screener to visually inspect the image and decide whether to clear the bag/item or to call for a manual search of the bag/item. After completing visual inspection and, if needed, verbally notifying search personnel to search a scanned bag/item and assisting the search personnel in locating and removing the bag/item if it needs to be searched, the screener activates the scanner conveyor and scans the next bag/item. This sequence is repeated for each bag/item scanned for inspection. Consequently the flow of bags and items such as trays containing a collection of loose objects, packages, etc. and the advance of persons carrying these bags/items through the checkpoint can progress no faster through the system than the rate of conveyor manipulation and manual visual examination of each x-ray image by a single screener. Typically included in the time needed for the screener to complete the screening (inspection) of a bag/item are (1) the time required to start the conveyor and control the conveying of the bag/item through the scan zone to take a scan and then stop the conveyor, (2) the time needed to visually examine the resulting x-ray image, (3) the time required to make a decision to clear the bag/item or call for a manual search, (4) in the event of a decision to call for a manual search the time required to verbally notify search personnel of what to search for, and (5) manipulation of conveyor position so that the searcher can locate and retrieve the bag/item to be searched.

As a result of the limitations discussed above the x-ray scanning equipment, associated conveying systems, peripheral equipment such as metal detectors and explosives detection systems, and a team of trained security personnel to man and operate the security checkpoint are limited to processing bags/items and their associated persons at a rate limited by time requirements for one screener to perform scanner start and stop operations for every bag/item scanned, time required for that same screener to visually examine every x-ray image produced, time required for that same screener to verbally alert search personnel to any bags/items that need manual search, time required for that same screener to verbally convey to the search personnel what they should be looking for within the suspect bag/item, and time required for that same screener to assist the search personnel in locating and securing the suspect bag/item. According to TSA personnel at the Nashville International Airport, present day average throughput rate of bags/items through an x-ray scanner is approximately 150 bags/items per hour. They have said that 200 bags/items per hour is top rate during rush periods.

As discussed in the following, and as provided by the present invention, many more bags/items can be scanned through the system in a given period, and thus pass through the checkpoint, allowing a greater flow of people and their carried items to be cleared through the checkpoint if requirements for a screener to stop/start the scanning operation during each x-ray image inspection is reduced or eliminated. In the present invention, multiple screener image inspection stations can be utilized to simultaneously inspect multiple different x-ray images if needed such that bags/items continue to be scanned during the times that x-ray images are being visually inspected, and screeners are relieved of the need to verbally communicate to search personnel information concerning bags/items to be searched.

FIELD OF THE INVENTION

The inventive x-ray data handling system and operating method provides for increased processing of persons and their carried baggage/items through security checkpoints thereby reducing capital costs and operating costs for clearing people and their carried baggage/items for entry into secure areas at installations such as airports, federal buildings, seaports, and other sensitive installations.

Typical security checkpoint x-ray scanning systems, such as the Rapiscan series of scanners or the Heimann series of scanners, are designed to produce an x-ray image of a bag/item as it is conveyed through the scanning region. The x-ray image resulting from a scan is displayed on the scanner's single screener inspection station visual monitor until replaced by the next x-ray image resulting from the next scan. Consequently, in today's machines after each scan of a bag/item the scanning process is halted to allow a screener the opportunity and time to inspect the x-ray image since the image will be replaced by the next scan. The present invention, instead, uses a computer system to record in its memory the scanned image data from the scanner and provides for visual display of the image to a screener when the screener is ready while in the meantime allowing the scanner to be taking additional scans. This invention eliminates the need to stop the scanning process and the flow of materials through the scanner between scans. If, for instance, the scanning conveyor runs continuously, instead of stopping and starting scanning and the conveyor carrying bags/items through the scanning region for each bag/item inspected, then for a typical scanner conveyor speed of 40 ft/min a conveyed length of approximately 2400 feet flows through the scanning machine in one hour. Placing a bag/item on the continuously flowing conveyor every four feet for example and scanning bags/items as they pass through the scanning region allows the scanner to scan about 600 bags/hr. This rate is approximately four times as many bags as are now processed in a single checkpoint using today's start/stop scanner technology for each x-ray image produced. In effect when operating a scanning machine using present technology, we estimate that approximately three-fourths of the time is spent starting/stopping the conveyor, inspecting the scanned image before the next bag/item is scanned, and verbally relaying search instructions to searchers. The scanner is applied to actually scanning bags/items and moving them through the system only about one quarter of the time. Importantly, from a cost and process flow viewpoint, the security personnel manning the checkpoint must wait, along with waiting passengers, for the screener to start/stop the scanning and conveyor and examine an x-ray image before another bag or the next passenger can pass through the checkpoint.

We have determined through testing with trained screeners that a single screener can perform x-ray image inspections up to rates exceeding 400 bags/items per hour which is several times the rates achieved in today's typical checkpoint if the screener is relieved of the task of controlling the scanner including starting and stopping the conveyor for each bag/item scanned, and relieved from performing verbal communications with baggage searchers in identifying bags to them and describing to them what to look for in the bags. The present invention relieves the screener of these tasks.

The present invention provides that a series of bags/items can be processed through an x-ray scanner by scanning the bags/items in a series of x-ray scans without stopping scanning and performing image inspection between scans. In this way a series of bags/items can be processed through the x-ray scanner with the conveyor delivering them into, through, and out from the scanner in a continuous flow. An x-ray image produced from the scanning may be of an individual bag/item or a group of bags/items depending upon how they are presented to the scanner (i.e., singly or in groups). The invention provides that image data produced by scanning is acquired by a computer that stores data to produce electronic images in an image data queue in computer memory. This data is preserved in computer memory as the scanner continues to take additional scans. Electronic image data is delivered from the queue for display of its electronic image on a screener station display monitor when a station is ready to receive and display an image for screener inspection.

In one embodiment the scanner generates a sequence of x-ray measurements and outputs an analog video stream of resulting electronic images for display. A computer system acquires the video stream from the scanner and digitizes the analog video stream (in this case originally intended for the scanner's single inspection station monitor). An image processing subsystem of the computer system isolates an electronic image of a bag/item or group of bags/items within the digitized data stream and performs an inverse mapping function to extract x-ray data from the electronic image. This data is stored into an electronic image data queue. The data is preserved in computer memory allowing the scanner to continue to take additional scans before screener inspection of the electronic image corresponding to the data is completed. A screener inspection station ready to receive an image is selected by the computer system and electronic image data from the queue is routed to an x-ray image enhancement software subsystem. The image enhancement software processes the electronic image data and provides a visual display of an electronic image derived from that data on the display monitor at the selected screener inspection station. The x-ray image enhancement software further allows the screener at the selected inspection station to manipulate the color map for the electronic image being viewed so to enhance the view with different color mappings at the discretion of the screener during visual inspection. Each of the screener inspection stations supported by the computer system can have its own x-ray image enhancement software subsystem running within the computer. Each station also can have a physical keyboard with special purpose function keys to select parameters of the color mapping function of the x-ray image enhancement software subsystem that generates the various color mapped image presentations. Each station also can have a software keypad, such as touch buttons displayed on a touch screen, to select the parameters of the color mapping function of the x-ray image enhancement software subsystem that generates the various color mapped image presentations.

In another embodiment the scanner generates scan data corresponding to a bag/item or group of bags/items and this data is stored by a computer system into an electronic image data queue. The data is preserved in computer memory allowing the scanner to continue to take additional scans before screener inspection of the electronic image corresponding to the data is completed. A screener inspection station ready to receive an image is selected by the computer system and electronic image data from the queue is routed to an x-ray image enhancement software subsystem. The image enhancement software processes the electronic image data and provides a visual display of an electronic image derived from that data on the display monitor at the selected screener inspection station. The x-ray image enhancement software further allows the screener at the selected inspection station to manipulate the color map for the electronic image being viewed so to enhance the view with different color mappings at the discretion of the screener during visual inspection. Each of the screener inspection stations supported by the computer system can have its own x-ray image enhancement software subsystem running within the computer. Each station also can have a physical keyboard with special purpose function keys to select parameters of the color mapping function of the x-ray image enhancement software subsystem that generates the various color mapped image presentations. Each station also can have a software keypad, such as touch buttons displayed on a touch screen, to select the parameters of the color mapping function of the x-ray image enhancement software subsystem that generates the various color mapped image presentations.

The present invention provides that the computer system receiving the scanner data can be connected to one or more screener inspection stations and has capability for distribution of an image to a visual display at one of the screener inspection stations when that station is ready to receive and display an image, irregardless of additional scans being performed by the x-ray scanning machine and irregardless of other images being displayed and visually inspected at other of the connected screener inspection stations. In this way x-ray images displayed are not replaced by subsequent scans, as happens with present day scanners, and images can be being visually inspected as subsequent scans of bags/items take place. The present invention provides that x-ray images can be distributed among a network of screener inspection stations. This is very advantageous if the volume of scans produced is more than can be effectively inspected at one inspection station. The computer system can monitor screener activity at each inspection station and transmit a new image to an inspection station when the screener at that station has completed visual inspection of the image displayed at that inspection station. In cases of distributing the x-ray images among multiple screener stations a screener may be visually inspecting an x-ray image over a time interval that overlaps in time with the time intervals for other screeners to visually inspect other x-ray images. In this way multiple x-ray images can be being inspected at the same time. The present invention also electronically associates bags/items with their x-ray images and automatically tracks bags/items through the system so that search personnel can easily and accurately locate a bag or item that a screener electronically selects for manual search without additional assistance from the screener.

The inventors have seen an x-ray scanner system that provides two display monitors for showing x-ray images. However, this system is different from the present invention in that a screener for screening x-ray images uses only one of the display monitors. The second display monitor is positioned at a search station and is used to show an x-ray image to assist the searcher in physically searching a bag/item that the screener has determined needs to be searched.

Another feature of the present invention is that screeners located remotely from the security checkpoint can inspect x-ray images of bags/items scanned at the checkpoint. In this way the screeners can examine x-ray images without the distractions of activities present at the checkpoint. An additional advantage to remote placement of screeners is that it can be effective for eliminating collusion between screeners and persons passing through the checkpoint. An example of a remote location is, for instance, a quiet room somewhere in an airport where x-ray images generated at security checkpoints within the airport are examined and screener selections of objects of interest, such as for search, electronically transmitted back to the appropriate checkpoints. Another example of a remote location is an x-ray image inspection center serving numerous checkpoints or even numerous sensitive installations that is located across town, across the state, or in another city or another state from the sensitive installations.

SUMMARY OF THE INVENTION

The present invention provides method and apparatus to increase throughput rate of people and their carried items through a security checkpoint that utilizes an electromagnetic scanner, such as an x-ray scanner, to help inspect items as they are passed through the checkpoint. The inventive scanner image data handling system, materials handling system, and operating method reduces operating costs and capital costs for clearing people and their carried bags/items for entry into secure areas at installations such as airports, federal buildings, seaports, and other sensitive installations. Among other features, the present invention removes the requirement that the screener operate the scanner and conveyor in addition to performing the visual screening of images as is done with present day systems. Included among the features of the new system are:

Method and means to electronically display for visual inspection an electronic image of a bag/item from a scan during the time that another bag/item is being scanned and its electronic image data is being generated. With present day scanning systems used to produce electronic images for visual display and inspection scanning of a subsequent bag/item can not be performed until inspection of the image of a previously scanned bag/item is completed Method and means for electronic images from a single scanner to be distributed among more than one screener inspection station, each station displaying a different image, enabling time-overlapping visual inspections of multiple electronic images. Present day scanning systems are limited to presentation and visual inspection of one image at a time on a single screener inspection station display.

Method and means to process image data at each screener inspection station among multiple networked inspection stations to provide various enhanced views of an image of a bag/item by providing different color mappings of image data.

Method and means for generation, distribution, and visual inspections of electronic images of articles derived from a continuous flow of articles moving through the scanner. Present day systems using scanners for visual image inspection operate such that the flow of articles through a scanner is stopped following each scan so that a screener can visually inspect the electronic image derived from the scan before the next article is scanned.

Method and means to automatically track location of articles as they pass through the scanning and inspection system so that an article is automatically located for further treatment, such as searching the contents of a bag, according to the electronic selection of that article for further treatment by a screener during visual inspection of that article's scanner electronic image. In present day systems articles to be acted upon, such as performing a physical search and inspection of a bag and its contents, are manually located.

Method and means to automatically remove from the flow of articles those articles selected for further treatment, such as searching, by screener visual image inspections. In present day systems articles to be acted upon, such as performing a physical search and inspection of a bag and its contents, are manually removed from the flow of articles.

Method and means for screener visual image inspections to be performed remote from the scanning region. Present day systems require the screener to be physically positioned near the scanning region wherefrom the screener operates the scanner and scanner conveyor in addition to performing the visual screening of images.

DETAILED DESCRIPTIONS OF THE PREFERRED EMBODIMENTS

Figure 1:
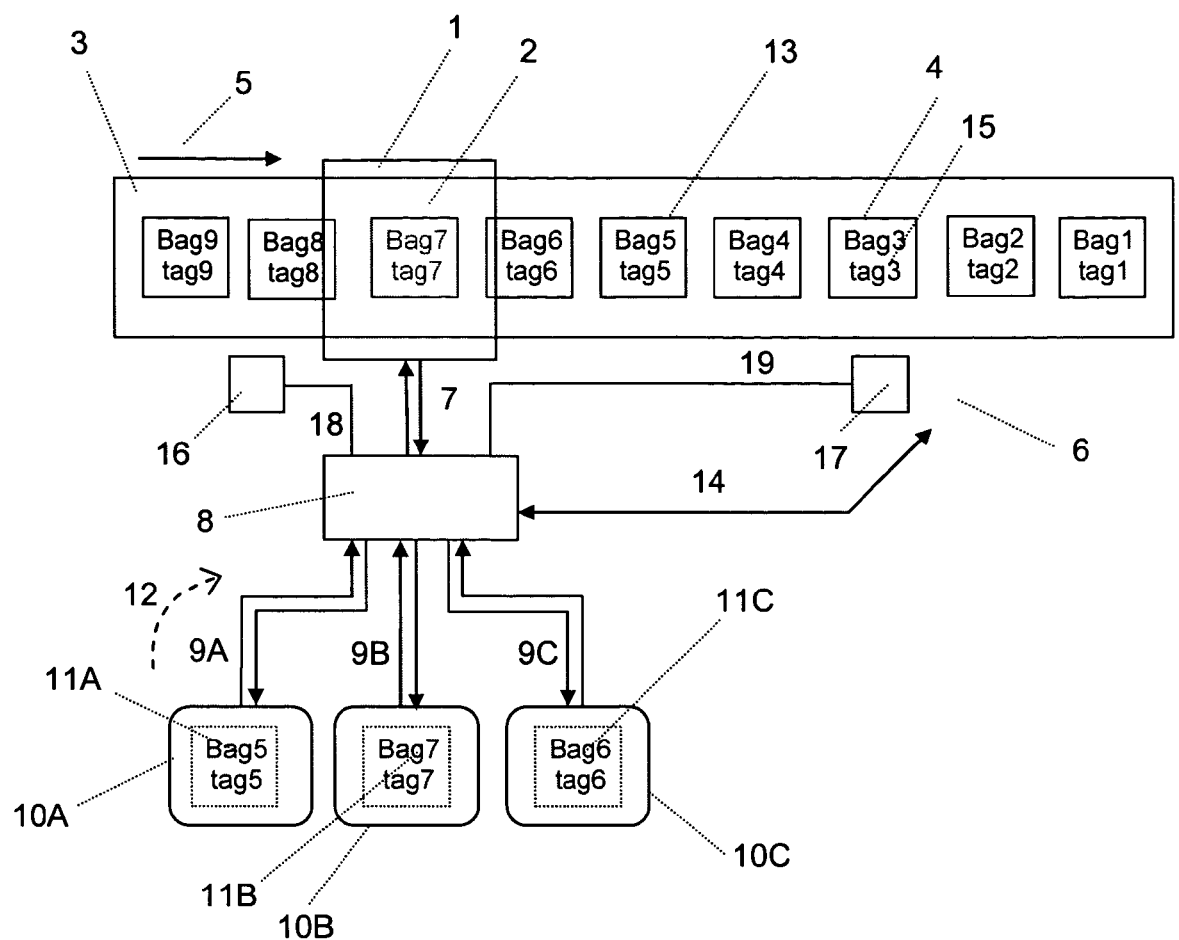
FIG. 1 is a schematic drawing illustrating x-ray image distribution features of the invention and bag tagging and bag tracking features of the invention.

Referring now to the drawings and FIG. 1 in particular, multiple bags/items 4 are placed on conveyor mechanism 3, for instance the surface of a conveyor belt, moving in direction 5 and are processed serially, either singly or in groupings, through x-ray scanner 1. As bags/items 4 pass through x-ray scan region 2 x-ray images 11 of the bags/items are generated. The x-ray images are transferred from x-ray scanner 1 to computer system 8 over electronic connection path 7 which may be wired or wireless. Computer system 8 may be internal to x-ray scanner 1 such that x-ray scanner 1 performs the functions described herein for computer system 8, external to x-ray scanner 1, or a combination thereof. Computer system 8 may be a microprocessor, several microprocessors, a computer, a system of computers, a network of computers, or any combination thereof. Electronic connection path 7 may be a unidirectional connection path carrying data from x-ray scanner 1 to computer system 8 or a bidirectional connection path supporting two way communications between computer system 8 and x-ray scanner 1. Computer system 8 routs each x-ray image 11 generated to one of computer monitors 10 over electronic connection paths 9 which may be wired or wireless. In the drawing three separate computer monitors 10 for visual display are depicted and shown as 10A, 10B, and 10C although any number of computer monitors may be utilized. Similarly, in the example of FIG. 1, three separate x-ray images 11A, 11B, and 11C are depicted as being displayed on monitors 10A, 10B, and 10C, an image of a different bag/item 4 on each monitor, having been sent over electronic connection path 9A, 9B, or 9C to monitors 10. Paths 9A, 9B, and 9C may be distinct from each other or may be a combined or networked electronic path between computer system 8 and monitors 10. Software running on computer system 8 provides that the x-ray image 11 at each monitor 10 may be independently manipulated by an operator (screener) manning the monitor to show different presentations, contrasts, edge enhancements, color maps, density maps, etc. of the x-ray image similar to such image manipulation features as are provided by many x-ray scanners. As x-ray images 11 are generated and each transmitted to a computer monitor among the group of monitors 10 the conveyor 3 continues to deliver un-scanned bags/items into and through x-ray scan region 2 such that x-ray images 11 can be being visually inspected on monitors 10 while additional x-ray images from scans of additional bags/items moving through the x-ray scanner are generated for distribution to monitors 10.

Each bag/item 4 placed on conveyor 3 has a tag 15 associated with it, as depicted in FIG. 1. The tag 15 can be a physical tag, such as a bar code or radio frequency identification (RFID) tag, which can be read for instance by a tag reader or sensor 16 or a tag reader or sensor 17 or similar readers/sensors positioned throughout the system. Tag 15 may alternatively be a software tag electronically associated with its particular bag/item within the memory of computer system 8, or both. During scanning, bag/item 4 position is tracked through the system by computer system 8, based upon conveyor belt position sensing, video tracking, position sensors such as photocell beam sensors stationed along conveyor 3, or inputs from tag reader or sensor 16 or tag reader or sensor 17 or similar readers/sensors positioned throughout the system. The particular tag 15 associated with each bag/item 4 moves along with its associated bag/item 4 as conveyor 3 advances bags/items 4 through the system. Tag readers or sensors 16 and/or 17, and/or conveyor belt position sensors, and/or position sensors (not shown) such as photocell beam sensors stationed along conveyor 3, and/or additional such readers/sensors as needed, provide information to computer system 8 over electronic connection paths 18 and 19 or similar connection paths, inputting the tag identity of each bag/item that is scanned by x-ray scanner 2 and the subsequent locations of the tagged bags/items 4 as they move through the system.

Each of monitors 10 is manned by a human operator (screener). The screener at each monitor visually inspects an x-ray image 11 displayed on that monitor looking for objects of interest such as contraband or threat objects within the bag/item 4 whose x-ray image is being displayed. If a screener determines there is potentially an object of interest within a bag/item 4 whose x-ray image is displayed on a monitor 10 being viewed by that screener, the screener electronically signals computer system 8 over data line 9 or similar data line that the bag/item 4 whose image is being inspected potentially contains an object of interest. Computer system 8 then electronically registers within its memory that particular bag/item 4 for further treatment. For instance, in FIG. 1 the screener at monitor 10A visually inspects the x-ray image 11A of a particular item such as Bag5 13 designated as 13 which is displayed on monitor 10A and determines that Bag5 13 may contain an object of interest. The screener then signals 12 computer system 8 over electronic connection 9A that the screener selected Bag5 13 as potentially containing an object of interest and computer system 8 electronically registers Bag5 13 in computer memory for further consideration. In the case shown the position of Bag5 13 has been advanced by the motion of conveyor 3 to a position downstream from x-ray scanner 1 by the time that the screener signals computer system 8 that the screener selects Bag5 13 as potentially containing an object of interest. Computer system 8 utilizes signals from tag readers/sensors 16 and/or 17, and/or from any additional similar readers/sensors within the system, and/or software tags within computer system 8, to recognize selected Bag5 13 as it moves through the system. When the selected Bag5 13 arrives at diversion station 6, computer system 8 signals diversion station 6 over electronic connection path 14, which may be wired or wireless, of the presence of selected Bag5 13 as a bag/item 4 potentially containing an object of interest. Appropriate action is then taken at diversion station 6 to secure selected Bag5 13 for further treatment. (See also FIG. 2).

Figure 2:
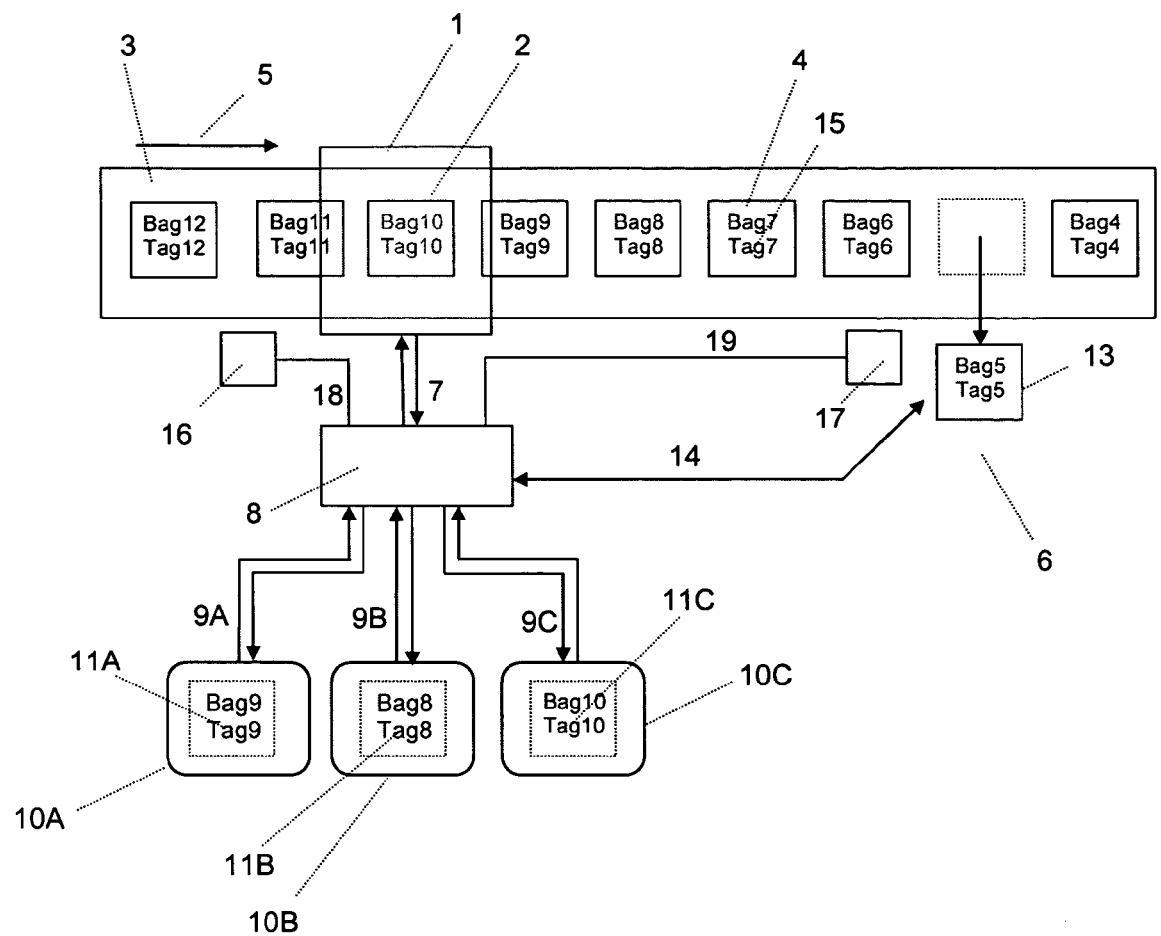
FIG. 2 is a schematic drawing illustrating the diversion of a bag for searching which has been tagged for search by a screener as illustrated in FIG. 1.

Referring to FIG. 2, conveyor 3 has advanced selected Bag5 13 to diversion station 6 where, responsive to electronic signals from computer system 8 over electronic connection path 14, selected Bag5 13 is, in this example, physically removed from conveyor 3 to a position P off conveyer 3 for further treatment. The selected Bag5 13 may be removed manually or by automated means. It is instructive to note in FIG. 2 that the x-ray images 11 displayed on monitors 10 in FIG. 1, having been inspected during the passage of Bag5 13 through the system and acted upon by the respective screeners at monitors 10, have now been replaced with new x-ray images in FIG. 2 for inspection by the screeners at monitors 10. Also it is instructive to note that Bag1 through Bag3 in FIG. 1 have been advanced through and out of the system by the time of FIG. 2, and are no longer illustrated in FIG. 2. Bag10 through Bag12 in FIG. 2 are bags/items 4 that have been introduced into the system since the time of FIG. 1.

Figure 3A:
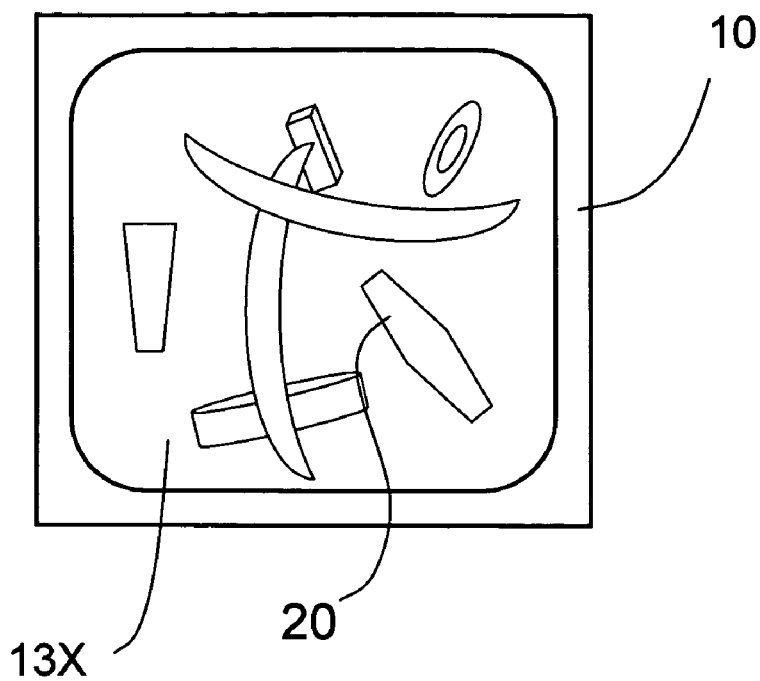
FIG. 3 shows two drawings of a computer monitor screen illustrating interactive selection for further treatment of an article displayed on the screen.
Figure 3B:
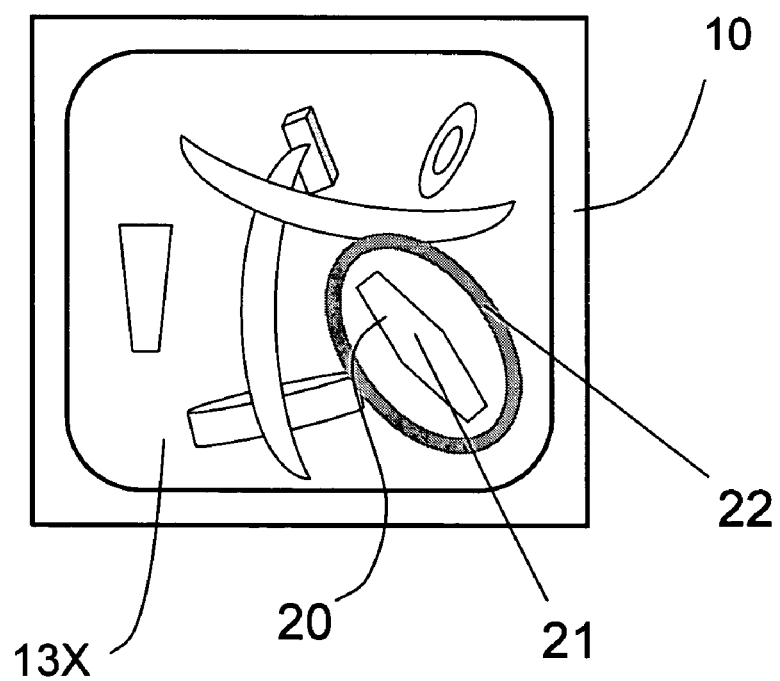

FIGS. 3a and 3b illustrate a preferred method utilizing a computerized pointing device such as a touch sensitive screen, computer mouse, light pen, track ball, etc. for a screener to signal to computer system 8 that the screener has identified a potential object of interest 20 within a bag/item, in this example bag/item 13 of FIG. 1 and FIG. 2. The preferred method using a touch sensitive screen or other interactive device is more fully discussed in U.S. Pat. No. 6,124,560, Re-issue application Ser. No. 10/252,444, and patent application Ser. No. 10/328,328, all owned by the owner of the instant application. FIG. 3a illustrate a computer monitor 10 which in the present embodiment incorporates a touch sensitive screen as a computerized pointing device. An x-ray image 13X of the exemplar bag/item 13 is displayed on the touch sensitive screen of monitor 10 and is visually examined by a screener. Through use of software running on computer system 8 (FIG. 1 and FIG. 2), which is analogous to that described in U.S. Pat. No. 6,124,560, the x-ray image 13X can be manipulated by the screener manning the monitor to show different presentations, contrasts, edge enhancements, color maps, density maps, etc. of the x-ray image similar to such image manipulation features as are provided by conventional x-ray scanning machines. In the embodiment depicted, the screener visually identifies the x-ray image of item 20 as an image of an object of potential interest, such as contraband or a threat object, and touches the touch screen of monitor 10 at a location 21 on the touch screen on or near the image of item 20, as depicted in FIG. 3b, which electronically signals computer system 8 that the screener has selected the region in the image in the vicinity of the touch as containing a potential object of interest. Computer system 8 causes the region around touched location 21 to be visually highlighted on the screen with a region of interest (ROI) 22. In the illustrated embodiment, a line 22 is drawn around the touched position 21, as feedback of the selection to the screener. Contained near or in the ROI 22 is the image of the object of potential interest 20. In the preferred embodiment the screener has an opportunity to review this touch selection at location 21, as highlighted by ROI 22, and cancel the touch selection and ROI 22 if the screener changes his/her mind, or if satisfied with the touch selection at location 21, the screener can electronically submit the touch selection at location 21 to computer system 8. Submitting the touch location 21 by the screener confirms to computer system 8 the presence and approximate location of a potential object of interest within the bag/item 13 whose x-ray image 13x is being displayed on monitor 10, referred to in FIG. 1 and FIG. 2 in this example as selected Bag5 13. It should be noted that the system can be alternatively configured to directly report a touch at location 21 on the screen by the screener at the instance of the touch and preempt any review by the screener, and still remain within the scope of the present invention. Computer system 8, utilizing signals from tag readers/sensors 16 and/or 17, and/or conveyor position sensors or software tags, and/or position sensors such as photocell beam sensors stationed along conveyor 3, and/or other similar readers/sensors in the system, then provide at the appropriate time a notification of the arrival of the selected bag 13 at diversion station 6. This notification can be used as a signal to automatically remove the selected bag 13 from the flow of bags for further examination or otherwise notify personnel of the presence of selected bag 13 at diversion station 6.

An alternative method for the screener to signal to computer system 8 that the screener has visually identified an object of potential interest 20 within a bag/item 4 includes in the embodiment means for the screener to activate an electrical switch such as pushing a button, touch a touch sensitive screen "button", or otherwise activate a communication to computer system 8 by manual action, verbal action, or other analogous action. Computer system 8 can be configured to recognize the signal from the switch or the manual communication activated by the screener as signal from the screener that the screener has identified an object of potential interest within the bag/item 13 whose x-ray image 13X is being displayed on the screener's monitor 10. Computer system 8, utilizing input signals from tag readers/sensors 16 and/or 17, and/or conveyor belt position sensors or software tags, and/or position sensors such as photocell beam sensors stationed along conveyor 3, and/or other similar readers/sensors in the system, then provides, at the appropriate time, a notification of the arrival of selected bag 13 at diversion station 6. This notification can be used to initiate removal of the selected bag 13 from the flow of bags on conveyor 3 for further examination or otherwise notify personnel of the presence of selected bag 13 at diversion station 6.

Figure 4:
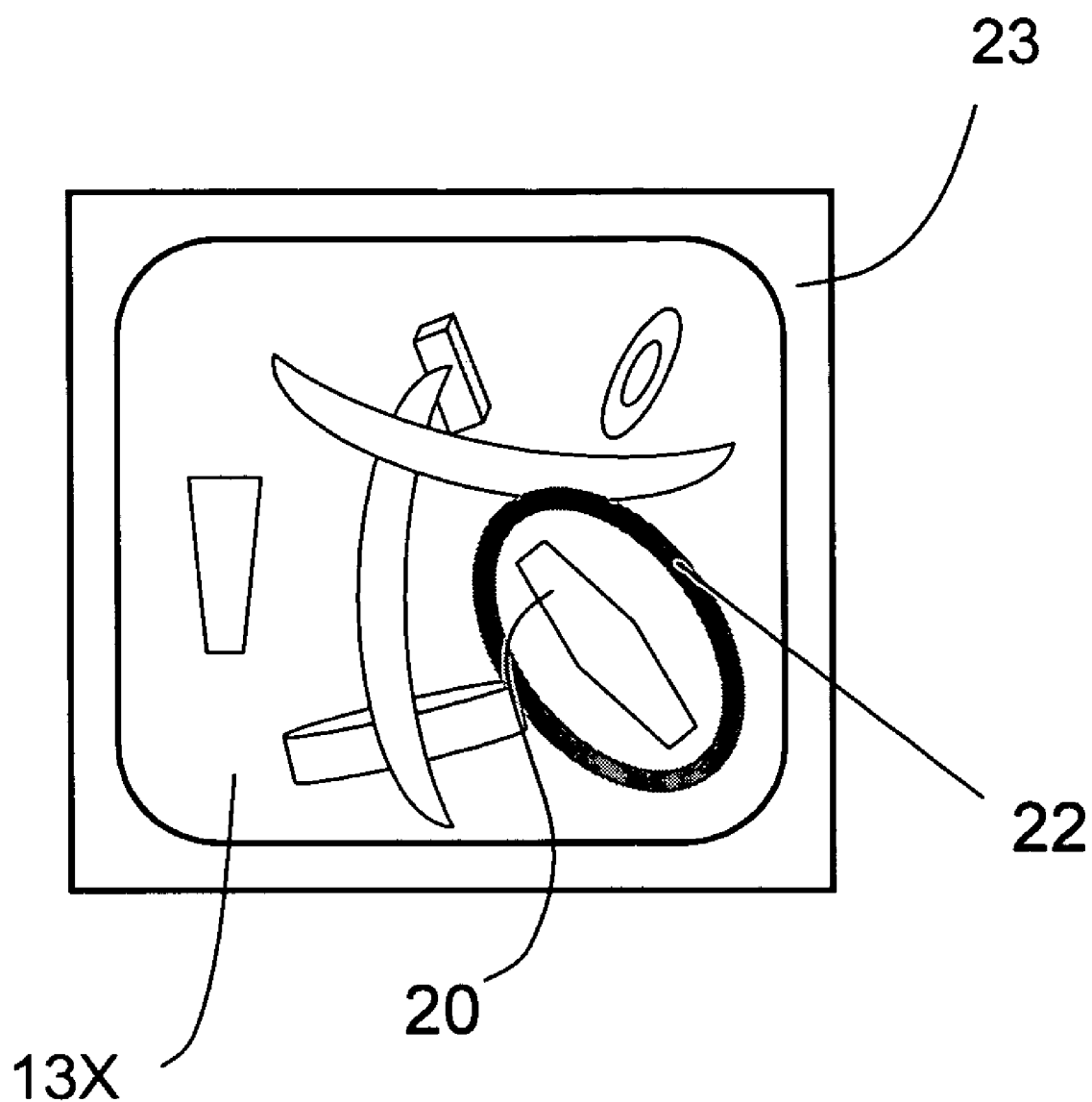
FIG. 4 illustrates the image displayed on another computer monitor screen resulting from the transmission of the selection illustrated in FIG. 3b to that computer monitor screen.

Referring again to the preferred method depicted in FIG. 3b, the location 21 on the screen where the screener touches the x-ray image 13X signals to computer system 8 the approximate location of the image of the potential object of interest 20 within x-ray image 13X and thus with some relativity the location in the inspected bag/item 13. As previously discussed, computer system 8 can cause the region around touched location 21 to be visually highlighted on the screen as illustrated with a region of interest (ROI) 22. Contained near or in the identified ROI 22 is the image of the potential object of interest 20. The position of the x-ray image 20 of the object of interest within the x-ray image 13X of the selected bag/item 13 that was x-ray scanned correlates to the physical location of the potential object of interest within the actual selected bag/item 13. This information can be useful for carrying out further examination of selected bag/item 13, represented by x-ray image 13X, such as physically searching the contents of selected bag/item 13 to locate and identify the potential object of interest represented by image 20 in x-ray image 13X. The flow of this information to personnel conducting further examination such as a physical search can be verbal or can be efficiently accomplished by computer system 8 transmitting the x-ray image 13X with ROI 22 marking the position of the image 20 of the object of potential interest to a different monitor 23, as shown in FIG. 4, as located convenient to where the further examination or manual search takes place, such as for instance location 29 illustrated in FIG. 5 and FIG. 6 wherein the station location is situated in the vicinity of diversion station 6.

Figure 5:
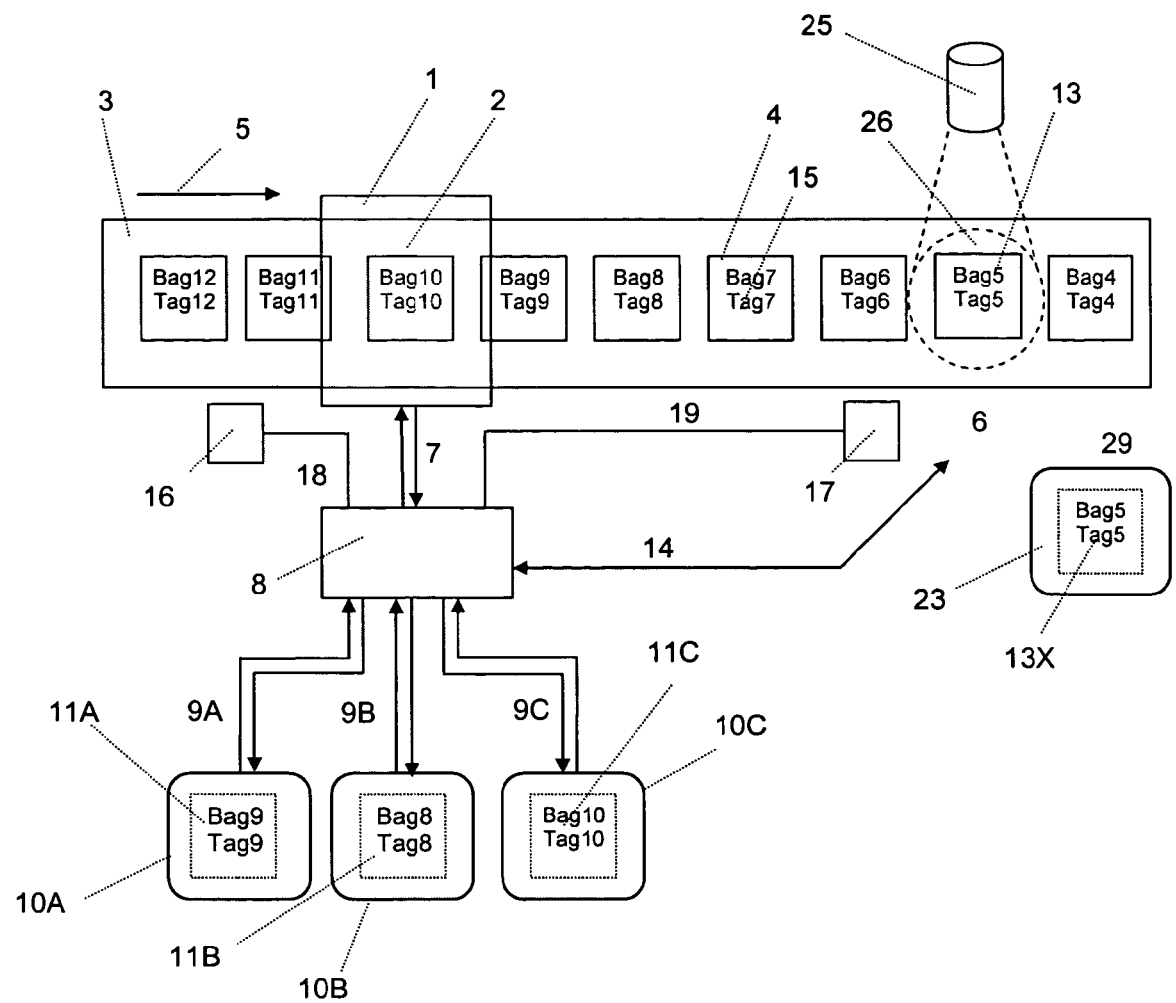
FIG. 5 is a schematic drawing that illustrates a bag which has been selected for search by a screener, tracked to a diversion location, and highlighted by casting a bright light upon it so to notify search personnel that the bag has been selected for searching.

FIG. 5 illustrates an alternative method for notification to personnel that a selected bag, such as bag 13, has arrived at diversion station 6. Upon arrival of a selected bag, such as selected bag 13 in this alternative embodiment, at diversion station 6, computer system 8 can cause lamp 25 to activate. Lamp 25 is positioned so that upon activation it illuminates an area 26 on conveyor 3. Computer system 8, conveyor 3, and lamp 25 are coordinated so that computer system 8 activates lamp 25 at the right time so that selected bag 13 is positioned within the illuminated area 26. Personnel in the vicinity of diversion station 6 can see the illuminated selected bag 13 and then take action for further examination of selected bag 13, such as removing selected bag 13 from the conveyor 3 and manually searching selected bag 13 for potential objects of interest such as contraband or threat objects. In place of, or coincident with, activation of lamp 25 an annunciator such as an audible alarm or visual alarm, such as a flashing light or a wireless activated annunciator (such as a vibrating annunciator), may be activated to draw the attention of personnel to selected bag 13 at diversion station 6. If desired, computer system 8 may cause the motion of conveyor 3 to stop with selected bag 13 held at diversion station 6 until appropriate action is taken. In such case the conveyor 3 may be put back into motion upon signal from diversion station 6 that appropriate action has been taken with respect to selected bag 13. Also upon signal from diversion station 6 that appropriate action has been taken with respect to illuminated selected bag 13 lamp 25 may be deactivated so that area 26 is no longer illuminated until signal is received from computer system 8 that another selected bag has arrived at diversion station 6 and lamp 25 is again activated. It should be noted that such interruption of the flow of conveyor 3 will slow the overall processing of scanning, it is still significantly enhanced over current conventional methods.

Figure 6:
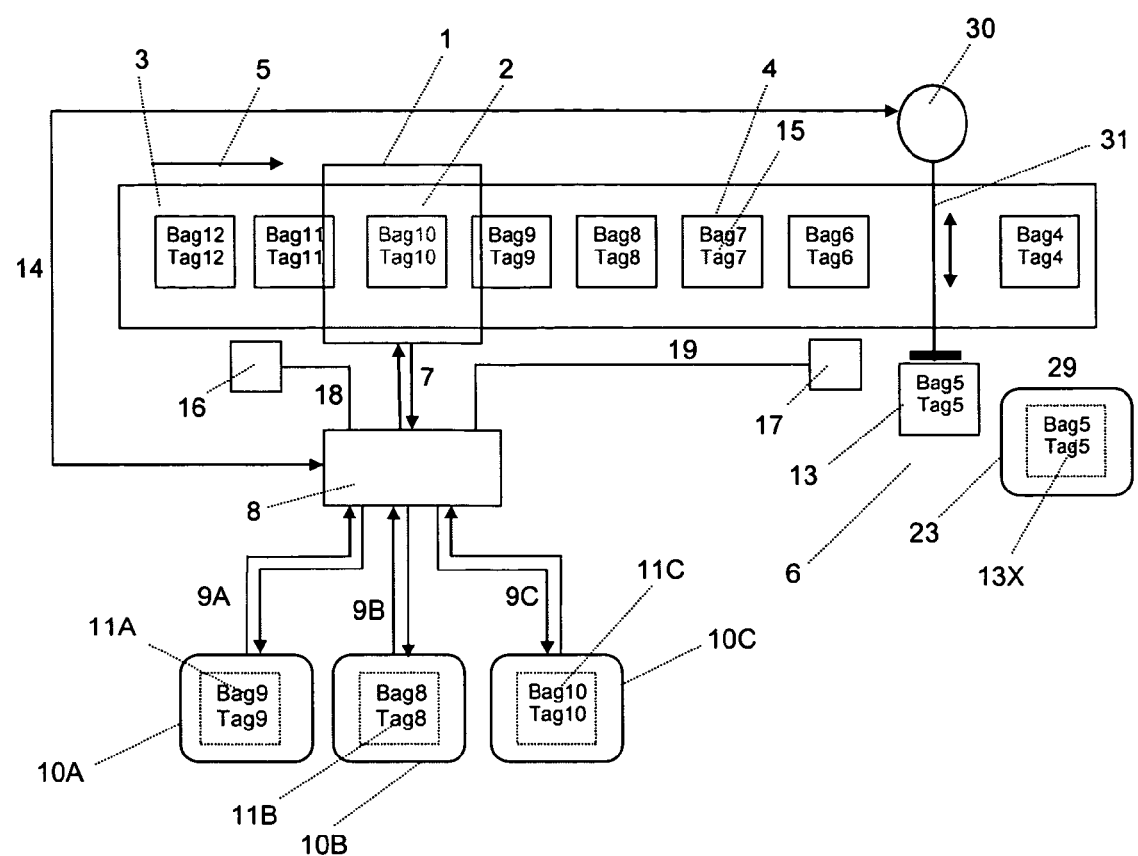
FIG. 6 is a schematic drawing that illustrates a bag which has been selected for search by a screener, tracked to a diversion location, and automatically diverted from the flow of bags.

FIG. 6 depicts another alternative method for notification to personnel that a selected bag, such as bag 13, has arrived at diversion station 6 and further initiates the automatic removal of the selected bag 13 from the flow of bags on conveyor 3. Upon arrival of a selected bag, such as bag 13 at diversion station 6 computer system 8 can signal over electronic connection path 14 causing bag diverter 30 to activate. Bag diverter 30 is positioned along conveyor 3 at diversion station 6. Computer system 8, bag diverter 30, and conveyor 3 are coordinated so that computer system 8 activates bag diverter 30 at the right time so that selected bag 13 is removed from conveyor 3 by the action of diverting mechanism 31 of bag diverter 30 as shown. Personnel in the vicinity of diversion station 6 can visually see the selected bag 13 being removed from conveyor 3 and are thus alerted to take action for further examination of selected bag 13, such as manually searching selected bag 13 for potential objects of interest such as contraband or threat objects. An annunciator such as an audible alarm or visual alarm such as a flashing light or a wireless activated annunciator (such as a vibrating annunciator) may be activated to annunciate to personnel that selected bag 13 has been removed from conveyor 3. If desired, computer system 8 may cause the motion of conveyor 3 to stop with selected bag 13 held in position in the path of the diverting mechanism 31 of bag diverter 30 until bag 13 is removed from conveyor 3. In such case the conveyor 3 may be put back into motion upon signal from diversion station 6 that selected bag 13 has been removed from conveyor 3 and the diverting mechanism 31 of bag diverter 30 has been retracted.

Another feature of the present invention is that monitors 10 can be located remotely from the security checkpoint which includes x-ray scanner 1, conveyor 3, diversion station 6, and other peripheral equipment. In this way the screeners stationed at monitors 10 can examine x-ray images 11 without the distractions of activities present at the checkpoint. An additional advantage to remote placement of screeners is that it can be effective at eliminating collusion between screeners and persons passing through the checkpoint. Another advantage is that screeners could be shared among different checkpoints as needed. An example of a remote location is, for instance, a quiet room somewhere in an airport where x-ray images generated at security checkpoints within the airport are examined and screener selections of objects of interest transmitted back to the appropriate checkpoints. Another example is an x-ray image inspection center serving numerous checkpoints or even numerous sensitive installations that is located across town, across the state, or in another city or state.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A method for expediting the inspection of articles containing discrete objects in a series of articles in a queue wherein the articles are conveyed substantially continuously through an inspection zone from an input zone to a diversion zone to select for further examination certain discernable potential threat objects within an article in the series of articles to determine the presence of one or more potential threat objects within an article comprising steps of:
    (a) continuously conveying each of the articles in the series of articles containing discrete objects into and through an inspection zone;
    (b) successively irradiating each of the articles in said series of articles containing discrete objects with incident electromagnetic radiation while in said inspection zone;

(c) measuring the electromagnetic radiation emanating from each of said irradiated articles in said series of articles containing discrete objects;

(d) processing said measured electromagnetic radiation to produce and store one or more electronic images of each of said irradiated articles in said series of articles containing discrete objects;

(e) sequentially presenting an electronic image of an article for visual display on one of a plurality of visual displays for examination of discrete objects;

(f) presenting the electronic image of the next article in the queue to a second of the plurality of visual displays for examination of discrete objects;

(g) sequentially presenting the electronic images of the next several electronic images of the articles in the queue on one of the total of inspection displays until each display presents an electronic image for examination of discrete objects in an article in the queue;

(h) interactively selecting, from a visual display, discrete objects discernable within the image of an irradiated article in said series of articles containing discrete objects;

(i) examining the selected discrete objects and determining the presence of a potential threat object among any of the selected discrete objects within the article;

(k) storing the determination respecting the examination of the article in conjunction with the storage of the electronic image of the article; and (l) replacing the displayed image of the examined article upon which the determination has been made with an electronic image of an unexamined article in the queue.

2. The method of claim 1 wherein said selections are visually marked on the image of an irradiated article in said series of articles containing discrete objects presented on said displays.

3. The method of claim 1 wherein said images are electronically registered within a computer.

4. The method of claim 3 wherein said selections are electronically registered within said computer.

5. The method of claim 4 wherein said selections and said images are stored in a searchable database of a computer.

6. The method of claim 5 wherein said selecting of discrete objects of an irradiated article takes place on a visual display at a location remote from the location where said irradiating occurs.

7. The method of claim 6 wherein said images are electronically registered in an image queue corresponding to the article queue to be accessed at a visual display.

8. The method of claim 4 wherein said computer records the completion of selecting of objects on a visual display.

9. The method of claim 8 wherein said computer sequentially forwards a successive images of one of said irradiated articles not presented on a display to any visual display not displaying an article electronic image.

10. The method of claim 9 wherein the successive images of irradiated articles stored in the image queue of a computer are successively displayed on a visual display after completion of the selection of objects of a displayed image.

11. The method of claim 1 wherein said electromagnetic scanning comprises x-ray scanning.

12. The method of claim 1 wherein said selecting is performed by use of a computerized pointing device.

13. The method of claim 1 wherein said selecting is performed by use of activating an electrical switch.

14. The method of claim 1 wherein the inspection of articles includes locating at least one of said selected articles among said series of articles between said input zone and said diversion zone.

15. The method of claim 14 wherein said locating is performed using radio frequency identification sensing.

16. The method of claim 14 wherein said locating is performed by bar code sensing.

17. The method of claim 14 wherein said articles are carried from said input zone to said diversion zone on a conveyor.

18. The method of claim 17 wherein said locating is performed by conveyor belt position tracking.

19. The method of claim 14 wherein said locating is performed by computerized software position tracking.

20. The method of claim 14 wherein said locating is performed by video position tracking.

21. The method of claim 14 wherein said locating is performed by position sensor tracking.

22. The method of claim 14 wherein said locating is performed by lighting system position annunciation.

23. The method of claim 14 wherein said locating is performed by wireless system annunciation.

24. The method of claim 14 wherein said locating is performed by audible alarm position annunciation.

25. The method of claim 1 including selecting for further examination at least one article from said series of articles.

26. The method of claim 1 including removing at least one of said located articles from said series of articles.

27. The method of claim 26 wherein said removing is performed by automated removal.

28. The method of claim 26 wherein said removing is performed by manual removal.

29. The method of claim 26 wherein said removing is in response to identification of an article in response to identification of a discrete object as a potential threat object.

30. The method of claim 26 wherein said removing is in response to said article reaching the diversion zone and its electronic image including discrete objects having not been presented on a display.

31. The method of claim 1 wherein at least one of said electronic images is visually displayed at a location remote from said electromagnetic scanning zone.

32. A method for expediting the inspection of articles containing discrete objects in a series of articles wherein the articles are conveyed substantially continuously through an inspection zone from an input zone to a diversion zone to select for further examination certain discernable potential threat objects within an article in the series of articles to determine the presence of one or more potential threat objects within an article comprising steps of:

(a) continuously conveying each of the articles in the series of articles containing discrete objects into and through an inspection zone;

(b) successively irradiating each of the articles in said series of articles containing discrete objects with incident electromagnetic radiation while in said inspection zone;

(c) measuring the electromagnetic radiation emanating from each of said irradiated articles in said series of articles containing discrete objects;

(d) processing said measured electromagnetic radiation to produce and store one or more electronic images of each of said irradiated articles in said series of articles containing discrete objects;

(e) sequentially presenting an electronic image of an article for visual display on one of a plurality of visual displays for examination of discrete objects;

(f) presenting the electronic image of a second article in said series of articles to a second of the plurality of visual displays for examination of discrete objects;

(g) sequentially presenting the electronic images of the next several electronic images of the articles in the series of articles on one of the total of inspection displays until each display presents an electronic image for examination of discrete objects in an article in the series of articles;

(h) interactively selecting, from a visual display, discrete objects discernable within the image of an irradiated article in said series of articles containing discrete objects;

(i) examining the selected discrete objects and determining the presence of a potential threat object among any of the selected discrete objects within the article;

(k) storing the determination respecting the examination of the article in conjunction with the storage of the electronic image of the article; and (l) replacing the displayed image of the examined article upon which the determination has been made with an electronic image of an unexamined article in the series of articles.

33. The method of claim 32 wherein said selections are visually marked on the image of an irradiated article in said series of articles containing discrete objects presented on said displays.

34. The method of claim 32 wherein said images are electronically registered within a computer.

35. The method of claim 34 wherein said selections are electronically registered within said computer.

36. The method of claim 35 wherein said selections and said images are stored in a searchable database of a computer.

37. The method of claim 36 wherein said selecting of discrete objects of an irradiated article takes place on a visual display at a location remote from the location where said irradiating occurs.

38. The method of claim 37 wherein said images are electronically registered in an image queue corresponding to the article queue to be accessed at a visual display.

39. The method of claim 34 wherein said computer records the completion of selecting of objects on a visual display.

40. The method of claim 39 wherein said computer sequentially forwards a successive images of one of said irradiated articles not presented on a display to any visual display not displaying an article electronic image.

41. The method of claim 39 wherein the successive images of irradiated articles stored in the image queue of a computer are successively displayed on a visual display after completion of the selection of objects of a displayed image.

42. The method of claim 32 wherein said electromagnetic scanning comprises x-ray scanning.

43. The method of claim 32 wherein said selecting is performed by use of a computerized pointing device.

44. The method of claim 32 wherein said selecting is performed by use of activating an electrical switch.

45. The method of claim 32 wherein the inspection of articles includes locating at least one of said selected articles among said series of articles between said input zone and said diversion zone.

46. The method of claim 45 wherein said locating is performed using radio frequency identification sensing.

47. The method of claim 45 wherein said locating is performed by bar code sensing.

48. The method of claim 45 wherein said articles are carried from said input zone to said diversion zone on a conveyor.

49. The method of claim 48 wherein said locating is performed by conveyor belt position tracking.

50. The method of claim 45 wherein said locating is performed by computerized software position tracking.

51. The method of claim 45 wherein said locating is performed by video position tracking.

52. The method of claim 45 wherein said locating is performed by position sensor tracking.

53. The method of claim 45 wherein said locating is performed by lighting system position annunciation.

54. The method of claim 45 wherein said locating is performed by wireless system annunciation.

55. The method of claim 45 wherein said locating is performed by audible alarm position annunciation.

56. The method of claim 32 including selecting for further examination at least one article from said series of articles.

57. The method of claim 32 including removing at least one of said located articles from said series of articles.

58. The method of claim 57 wherein said removing is performed by automated removal.

59. The method of claim 57 wherein said removing is performed by manual removal.

60. The method of claim 57 wherein said removing is in response to identification of an article in response to identification of a discrete object as a potential threat object.

61. The method of claim 57 wherein said removing is in response to said article reaching the diversion zone and its electronic image including discrete objects having not been presented on a display.

62. The method of claim 32 wherein at least one of said electronic images is visually displayed at a location remote from said electromagnetic scanning zone.

63. Apparatus for expediting the inspection of a series of articles containing discrete objects wherein the articles are conveyed substantially continuously through an inspection zone to select for further examination discrete objects within articles within the series of articles to determine the presence of one or more potential threat objects within an article comprising:

(a) a conveyor system for conveying each of the articles in the series of articles into and through an electromagnetic scanning zone;

(b) an electromagnetic scanner for irradiating the articles with electromagnetic radiation and taking electromagnetic measurements of the radiation emanating from each of the irradiated articles in the series of articles as they are conveyed through said scanning zone;

(c) a computer system for producing a series of electronic images of discrete objects in the articles within said series of articles from said electromagnetic measurements;

(d) a data processing system for processing said measured electromagnetic radiation to produce and store one or more electronic images of each of said irradiated articles in said series of articles containing discrete objects;

(e) a first of a plurality of visual displays for sequentially presenting an electronic image of an article for visual display on one of a plurality of visual displays for examination of discrete objects;

(f) a second of the plurality of displays for presenting the electronic image of the next article in the queue to a second of the plurality of visual displays for examination of discrete objects;

(g) successive of the plurality of displays for sequentially presenting the electronic images of the next several electronic images of the articles in the queue on one of the total of inspection displays until each display presents an electronic image for examination of discrete objects in an article in the queue;

(h) means for interactively selecting, from a visual display, discrete objects discernable within the image of an irradiated article in said series of articles containing discrete objects for examining the selected discrete objects and determination of the presence of a potential threat object among any of the selected discrete objects within the article; and (k) means for storing the determination respecting the examination of the article in conjunction with the data processing system storage of the electronic image of the article; and (l) means for replacing the displayed image of the examined article upon which the determination has been made with an electronic image of an unexamined article in the series of articles.

64. The apparatus of claim 63 wherein said electromagnetic scanner comprises an x-ray scanner.

65. The apparatus of claim 63 wherein said means for selecting comprises a computerized pointing device.

66. The apparatus of claim 63 wherein said means for selecting comprises an electrical switch.

67. The apparatus of claim 63 wherein said means for selecting comprises the human voice.

68. The apparatus of claim 63 further comprising means to locate at least one of said articles selected by the means for interactively selecting.

69. The apparatus of claim 68 wherein means to locate articles comprises at least one of (a) a radio frequency identification article tagging and tracking system, (b) a bar code article tagging and tracking system, (c) a conveyor encoder to track conveyor position, (d) computer software to track conveyor position, (e) a video system to track article position, (f) a system of discrete sensors for position tracking, (g) a lighting system to annunciate article arrival at a position, (h) a visual indicator to annunciate article arrival at a position, (i) a wireless system to annunciate article arrival at a position, (j) an audible alarm to annunciate article arrival at a position.

70. The apparatus of claim 63 further comprising means to remove from said series of articles at least one of articles from said conveyer.

71. The apparatus of claim 63 further comprising data handling means to transmit and display means to display at least one of said electronic images at a location remote from said electromagnetic scanner.

* * * * *